FIG. I

INVENTOR
CHARLES K. SUTTON

INVENTOR
CHARLES K. SUTTON

BY Arthur Jacob
HIS ATTORNEY

July 25, 1967 C. K. SUTTON 3,333,177
SELECTIVE CONTROL OF FREQUENCY AND VOLTAGE IN
ALTERNATING CURRENT POWER SYSTEMS
Filed Jan. 22, 1964 8 Sheets-Sheet 3

INVENTOR
CHARLES K. SUTTON
BY *Arthur Jacob*
HIS ATTORNEY

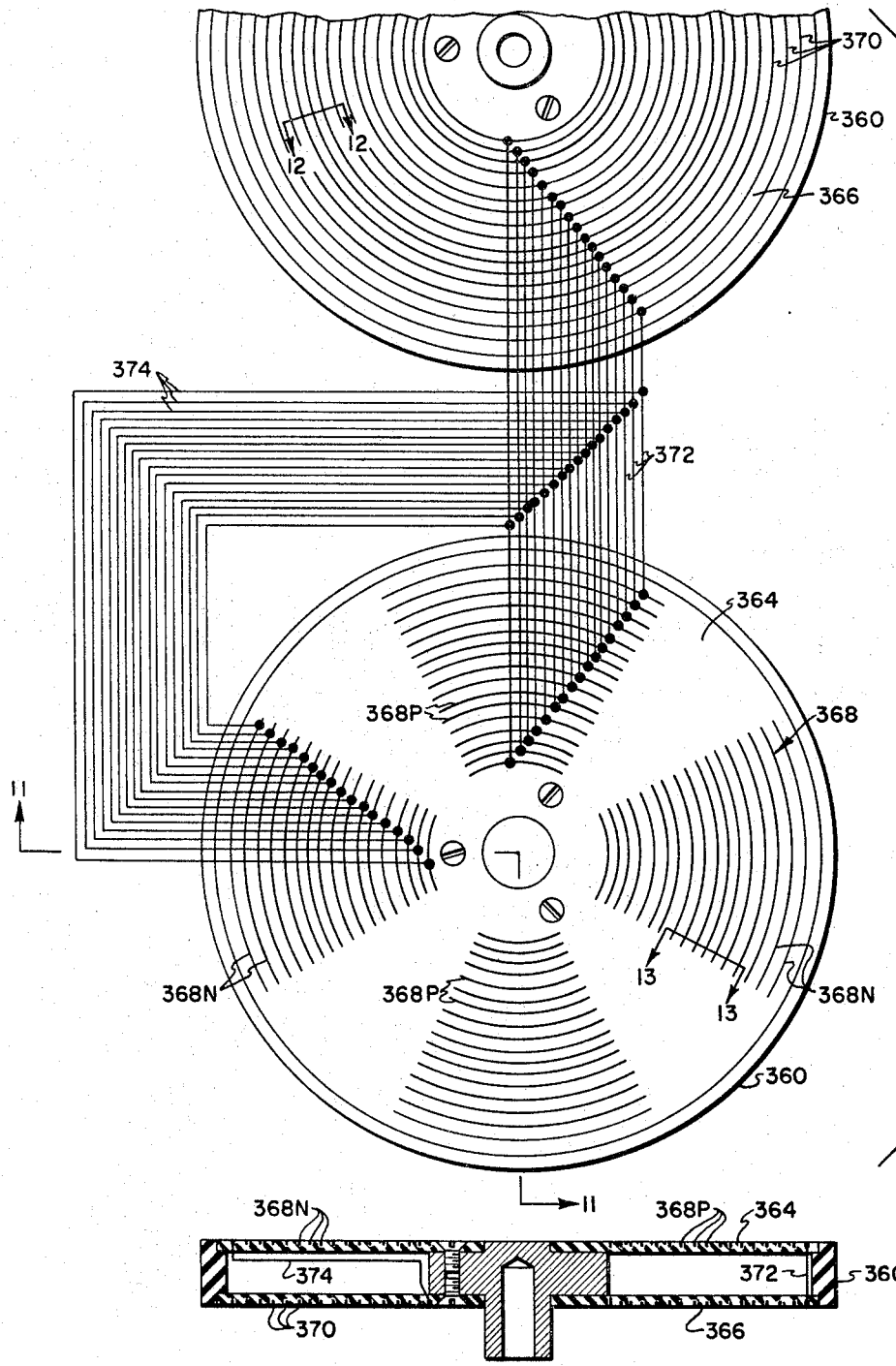

July 25, 1967 C. K. SUTTON 3,333,177
SELECTIVE CONTROL OF FREQUENCY AND VOLTAGE IN
ALTERNATING CURRENT POWER SYSTEMS
Filed Jan. 22, 1964 8 Sheets-Sheet 6

INVENTOR
CHARLES K. SUTTON
BY *Arthur Jacob*
HIS ATTORNEY

July 25, 1967  C. K. SUTTON  3,333,177
SELECTIVE CONTROL OF FREQUENCY AND VOLTAGE IN
ALTERNATING CURRENT POWER SYSTEMS
Filed Jan. 22, 1964  8 Sheets-Sheet 7

INVENTOR
CHARLES K. SUTTON

BY Arthur Jacob
HIS ATTORNEY

July 25, 1967  C. K. SUTTON  3,333,177
SELECTIVE CONTROL OF FREQUENCY AND VOLTAGE IN
ALTERNATING CURRENT POWER SYSTEMS
Filed Jan. 22, 1964  8 Sheets-Sheet 8

INVENTOR
CHARLES K. SUTTON

BY Arthur Jacob

HIS ATTORNEY

United States Patent Office 3,333,177
Patented July 25, 1967

3,333,177
SELECTIVE CONTROL OF FREQUENCY AND VOLTAGE IN ALTERNATING CURRENT POWER SYSTEMS
Charles K. Sutton, 1720 Lincoln Highway, Highland Park, N.J. 08904
Filed Jan. 22, 1964, Ser. No. 339,431
9 Claims. (Cl. 321—2)

The present invention relates generally to the selection of a desired frequency, as well as a desired voltage, in alternating current systems having a source of alternating current of fixed freqeuncy and voltage. More specifically, the invention pertains to an apparatus for selectively varying the frequency, as well as the voltage, of a given source of alternating current over a desired range.

In many installations which employ electric motors as prime movers of machinery, it is often desirable to provide some means for allowing changes in the speed of operation of the motors in order to control the operation of the machinery. Such speed changes usually require infinite variation in speed over a generally broad range as opposed to changes providing a relatively few fixed speeds. In certain installations requiring such speed control, it is essential that speed variation be attained without introducing significant changes in the torque available from the motor or in the load placed upon the motor.

To meet the various requirements of industrial and transportation fields many types of direct current and alternating current motors have been developed. In terms of their speed-torque classifications they may be described as follows:

(A) Constant speed.
(B) Varying speed—speed varies with load changes.
(C) Adjustable speed—speed is varied by selective control.
(D) Multiple speed—a choice of two or more different constant speeds without intermediate adjustability.

Direct current motors are of four main types—shunt, series, compound, and compound-compensated, the latter three being classified as varying speed with load, while the shunt motor offers adjustable speed characteristics of the most accurate control available.

In contrast, alternating current motors are of the following primary types:
(A) Synchronous—an accurate constant speed machine.
(B) Induction—
  (1) Squirrel-cage—approximately constant speed.
  (2) Phase-wound—varying speed.
  (3) Commutator—adjustable speed machines.

Commutator alternating current motors do not quite match the direct current shunt motor in adjustable speed control since the speed of such motors is still more variable with load than is the speed of the direct current shunt type motor. However, the constant speed of the alternating current synchronous and squirrel-cage types is a function of the number of poles available in the motor and the frequency of the alternating current supply. If the alternating current frequency could be varied over an adjustable range, then the speed of the synchronous and squirrel-cage motors could be adjusted to an accuracy equalling that of the direct current shunt motor. It becomes apparent that the alternating current synchronous motor, being an exact frequency follower, could be employed where highly accurate, infinitely variable speeds are required if the frequency of the alternating current input to the motor could be readily and accurately varied to control the motor speed.

It is therefore an important object of the invention to provide means for obtaining a selected frequency output in alternating current power systems having a source of alternating current of fixed frequency and voltage.

Another object of the invention is to provide a simplified apparatus for establishing an accurately controlled output voltage of predetermined frequency in alternating current power systems having a source of alternating current of fixed frequency and voltage, the apparatus being largely mechanical in nature.

A further object of the invention is to provide apparatus for establishing the above controlled output, the apparatus having the maximum flexibility of control with accuracy and a minimum of complexity in design, construction and operation.

A still further object of the invention is to provide a simple and effective speed control for alternating current electric motors.

The invention may be described briefly as providing a selected frequency output in alternating current power systems having a source of alternating current of fixed frequency and voltage by employing apparatus capable of resolving the source alternating current into a plurality of fixed increments of voltage, then rectifying the alternating current in such fixed increments into a substantially direct current in a like number of fixed increments of voltage. These increments of direct current voltage are then integrated into an alternating current output having a stepped wave form approximating a sinusoidal wave, the integration being carried out at a rate selected independent of the frequency of the source alternating current voltage to attain the desired frequency in the output voltage. Both the rectification and the integration are accomplished mechanically by means of apparatus more fully described hereinafter.

The invention will be more fully understood and additional objects and advantages will become apparent in the following detailed description of an embodiment of the invention illustrated in the accompanying drawings in which:

FIGURE 10 is a diagrammatic view showing both faces of a rectifying disc;

FIGURE 11 is a partially diagrammatic cross-sectional view taken along line 11—11 in FIGURE 10;

Figure 1:
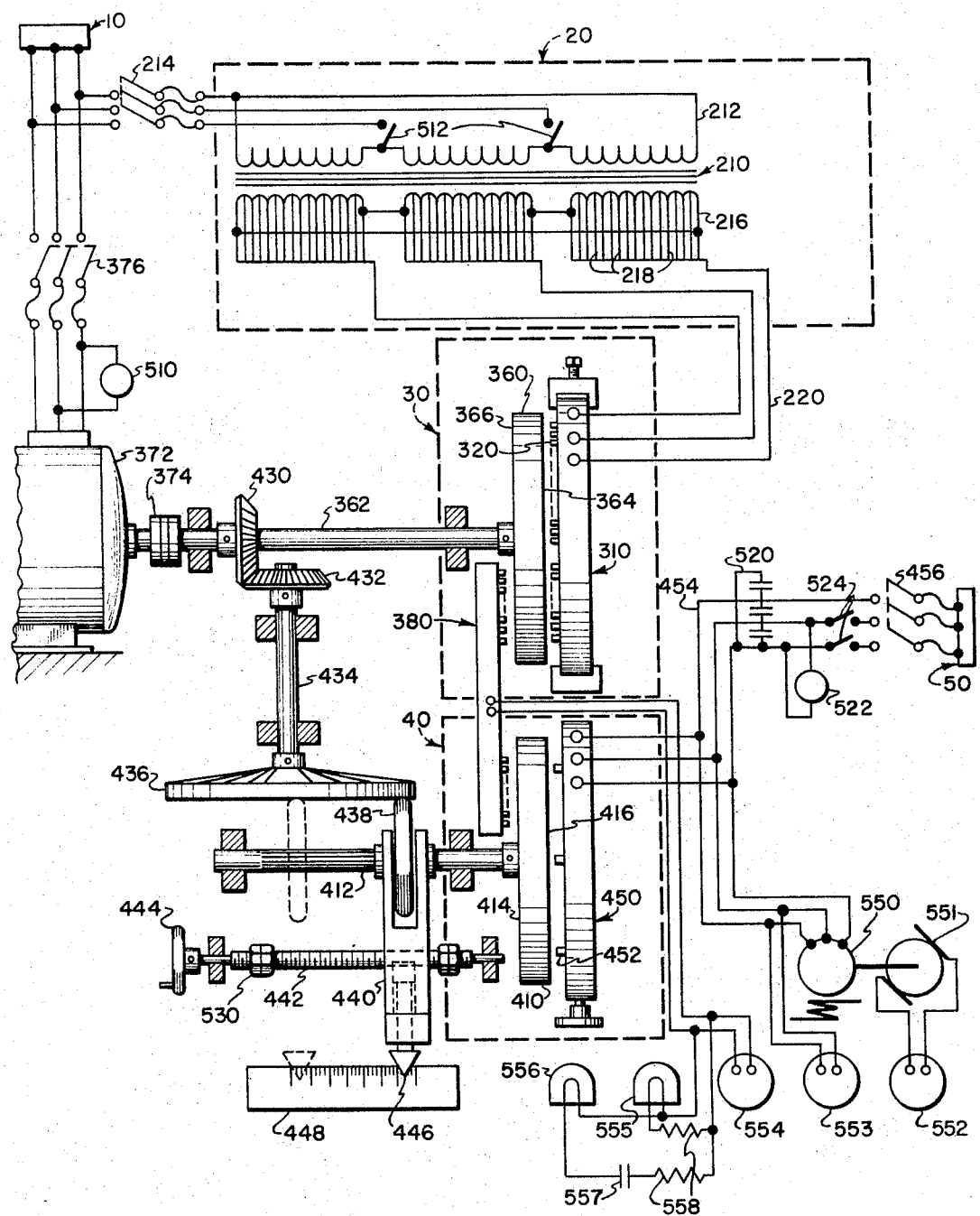
FIGURE 1 is a diagrammatic representation illustrating a method of the invention and an apparatus constructed in accordance with the invention.

Referring now to the drawings, and particularly to FIGURE 1, an apparatus constructed in accordance with the invention is shown in generally schematic form and illustrates both a method and apparatus for providing a selected frequency output in an alternating current power system having a source or supply 10 of three phase alternating current of fixed frequency and voltage. The three phase supply 10 is electrically connected to means 20 which resolves the alternating current voltage into a plurality of fixed increments of alternating current voltage between each leg of the three phase system in a manner which will be more fully described hereinafter in conjunction with FIGURE 4 as well as with FIGURE 1.

The fixed increments of alternating current voltage of each phase are conducted to a rectifying means, indicated generally at 30, wherein the fixed increments of alternating current voltage are rectified into a like number of fixed increments of direct current voltage. The details of the rectifying means 30 are more clearly set forth in FIGURES 1 and 4 through 13, and will be fully described later. Suffice it to say at this point that the rectified increments of voltage leave the rectifying means in the form of a pulsating direct current voltage which is graphically illustrated in FIGURE 2.

Figure 3:
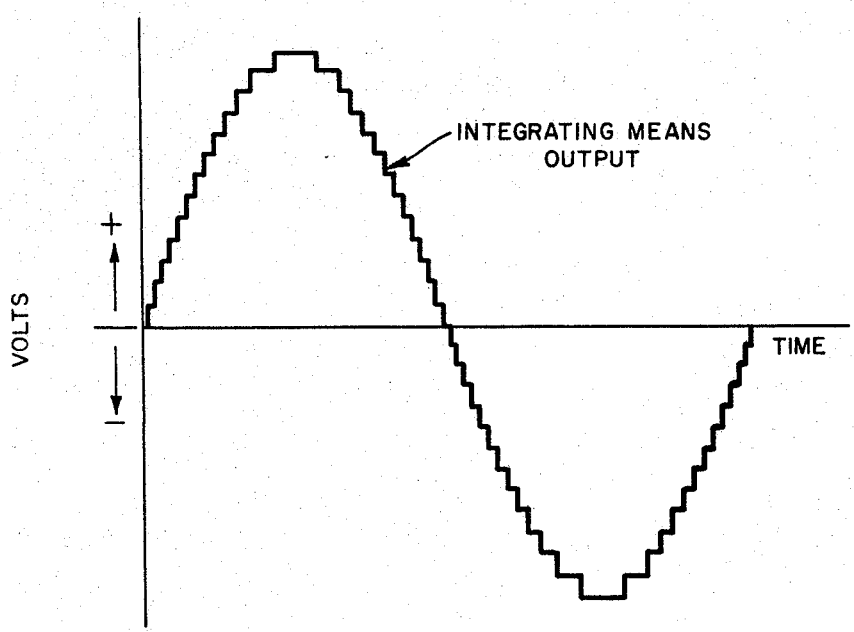
FIGURE 3 is a graph illustrating the output of the integrating means of the apparatus of the invention.

The pulsating direct current output of the rectifying means 30, in fixed increments of voltage, is conducted to an integrating means 40 wherein the fixed increments of direct current voltage are reconstructed, or integrated, into an alternating current output having a stepped wave form approximating a sinusoidal wave, as illustrated in the graph of FIGURE 3, across each leg of the three phase system. The rate at which the integration takes place is selectively adjustable, as will be shown in conjunction with a complete explanation of the details of the integration means 40 as set forth in FIGURES 1 and 16 through 22, so that a selected frequency is available at the output 50.

Figure 4:
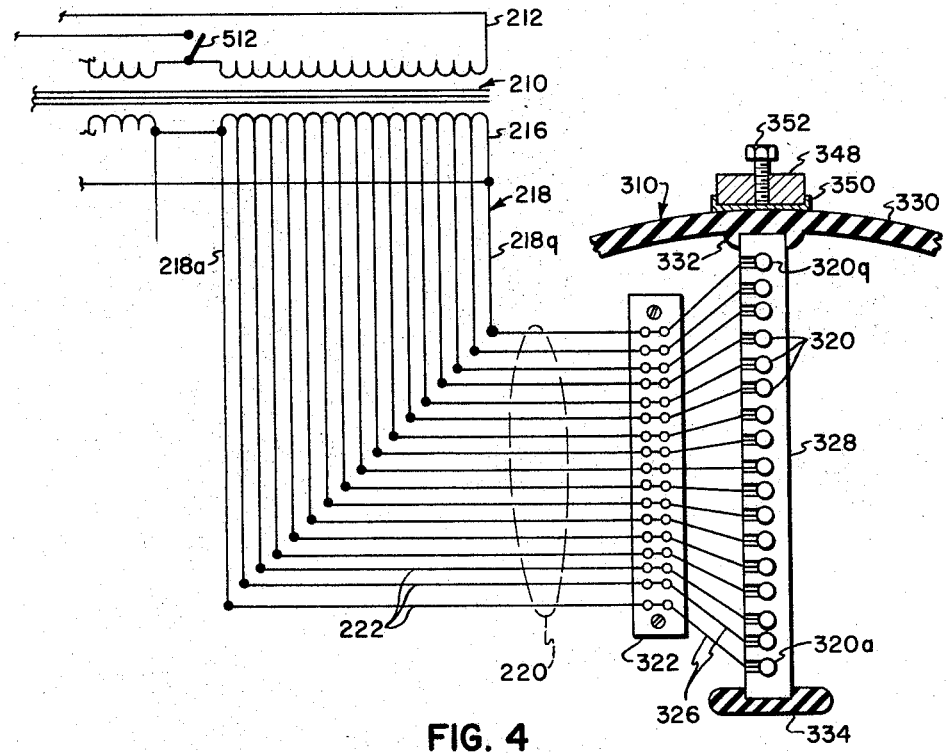
FIGURE 4 is an enlarged schematic detail of a portion of the apparatus.

Turning now to FIGURE 4, as well as to FIGURE 1, the means 20 is shown in the form of a three phase, delta-connected transformer 210 having primary windings 212 connected to the three phase supply 10 by means of a fused disconnect 214 (FIGURE 1). The supply voltage is resolved into the fixed increments of alternating current voltage in the secondary windings 216 which are provided with a plurality of taps 218 for establishing equal increments of voltage. The illustrated embodiment utilizes seventeen taps in each leg of the three phase system to provide sixteen equal increments of voltage in each leg. The taps of each leg are electrically connected by means of a seventeen conductor cable 220 to the rectifying means 30.

Figure 7:
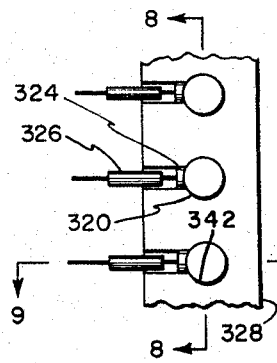
FIGURE 7 is an enlarged elevational view of a portion of FIGURE 5.
Figure 8:
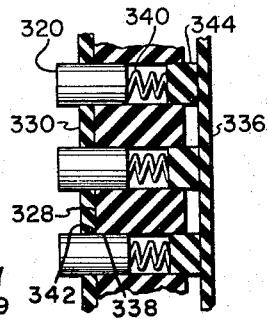
FIGURE 8 is a cross-sectional view taken along line 8—8 of FIGURE 7.
Figure 9:
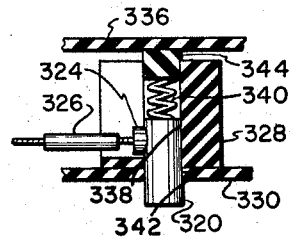
FIGURE 9 is an enlarged cross-sectional view taken along line 9—9 of FIGURE 7.
Figures 5, 6:
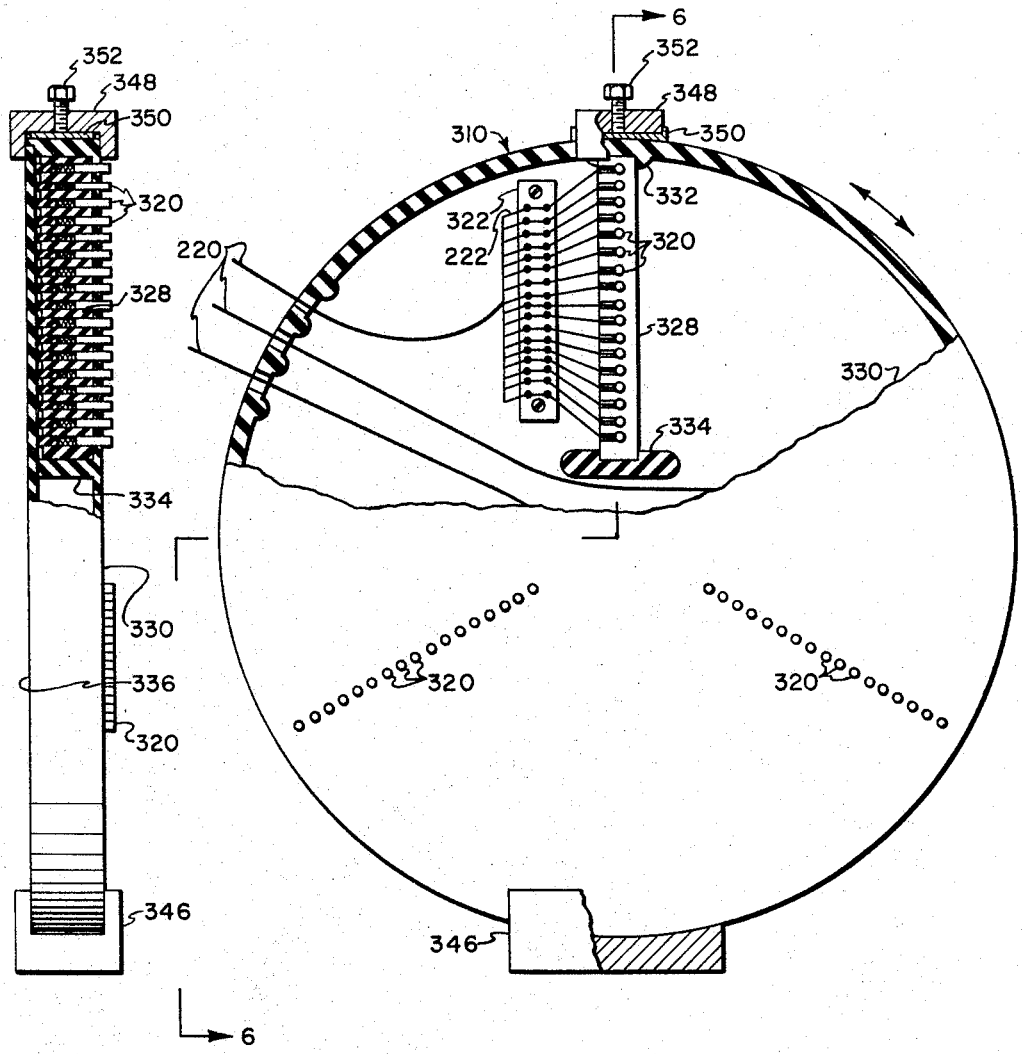
FIGURE 5 is a partially diagrammatic elevational view of a brush assembly.
FIGURE 6 is a partially diagrammatic cross-section taken along line 6—6 of FIGURE 5.

The details of the rectifying means of the illustrated embodiment are shown in FIGURES 4 through 13, as well as in FIGURE 1. Each conductor 222 of the multiple conductor cable 220 is terminated in a brush assembly 310 which has three radial lines of seventeen brushes 320 each (see FIGURES 1 and 5 through 9), the radial lines being angularly oriented, as best seen in FIGURE 5, to correspond to each leg of the three phase system. The conductors 222 are brought to a terminal block 322 where each conductor is electrically connected to a brush 320 at portion 324 through a lead 326. As best seen in FIGURE 4, each tap 218 is thus electrically connected to each brush in consecutive sequence to connect the first tap 218a to the innermost brush 320a and the last tap 218q to the outermost brush 320q. Each leg of the three phase system is connected to each line of brushes in an identical manner. A brush holder 328 maintains each line of brushes in place in the brush assembly 310, the brush holder 328 being fixed in place in the body 330 of the brush assembly 310 by brackets 332 and 334 and sealed within the body 330 by a cover 336, the brush holders, body and cover all being fabricated of a dielectric material. As best seen in FIGURES 7 through 9, each brush holder 328 is provided with a socket 338 for each brush 320, and springs 340 resiliently urge brushes 320 to project through apertures 342 in body 330, springs 340 being placed between brushes 320 and brush taps 344. The entire brush assembly is supported between mounts 346 and 348 and clamped in place by a shoe 350 urged against the body by screw 352. By releasing screw 352 and shoe 350, the brush assembly may be rotated about its central axis, as indicated in FIGURE 5, for purposes which will be explained shortly.

Returning to FIGURE 1, a rectifying disc 360 is seen mounted for rotation with shaft 362 adjacent the brush assembly 310 with face plate 364 of the disc placed adjacent body 330 of the brush assembly and face plate 366 opposite the face plate 364, each face plate being fabricated of a dielectric material. As best seen FIGURES 10 through 13, embedded in face plate 364, and thus fixed for rotation with disc 360, are a plurality of electrically conductive commutator elements 368 in the form of arcuate segments corresponding to the number of brushes 320 and radially located in face plate 364 such that each brush 320 will contact a corresponding segment 368 during rotation of the disc 360 relative to brush assembly 310. The commutator elements 368 are concentric about the central axis of the disc and are divided into four groups, or "poles," elements 368P designating two poles P while elements 368N delineate the other two poles N. A plurality of electrical contacts corresponding to the number of commutator elements in each pole are shown in the form of slip rings 370 embedded in the face plate 366 and arranged concentrically for rotation about the central axis of the disc 360. As illustrated schematically in FIGURES 10 and 11, each commutator element 368P is electrically connected to a corresponding slip ring 370 such that the diametrically opposed, radially innermost elements 368P of the two poles P are connected to the radially innermost slip ring 370 and each consecutive element 368P is connected to each consecutive ring, as indicated by conductors 374, such that the outermost diametrically opposed elements 369N of the two poles N are connected to the radially innermost slip ring 370 and each consecutive element 368N is connected to each consecutive ring until the radially innermost diametrically opposed elements 368N are connected to the radially outermost slip ring.

Figure 2:
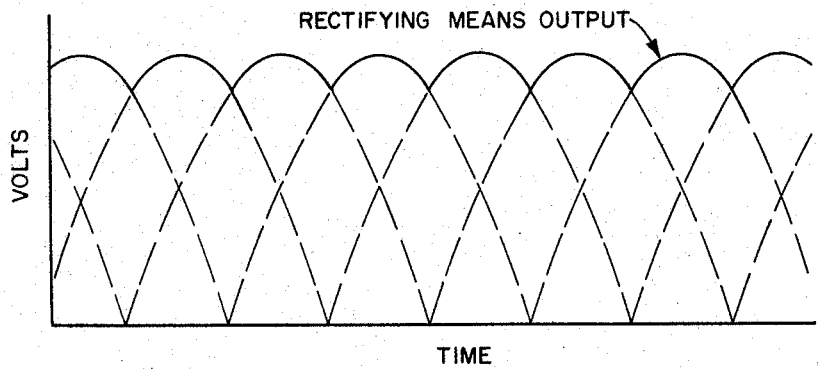
FIGURE 2 is a graph illustrating the output of the rectifying means in the apparatus of the invention.

It becomes apparent, then, that through such a series of electrical connections the rotation of rectifying dics 360 in synchronization with the fixed frequency alternating current supply available at source 10, the increments of alternating current voltage supplied to commutator elements 368 by brushes 320 are rectified into a corresponding number of increments of pulsating direct current voltage available at slip rings 370 (see FIGURE 2). Such rotation of disc 360 is accomplished by a relatively small three phase alternating current synchronous motor 372 (return to FIGURE 1) which is mechanically coupled to shaft 362 at coupling 374 and is electrically connected to supply 10 by means of a fused disconnect 376. Since motor 372 will follow the supply frequency, disc 360 will rotate in synchronization. In order to attain the proper phase angle relationship between the rotor of the motor 372 and the poles of face plate 364 of disc 360, the brush assembly 310 may be rotated within mountings 346 and 348, as explained above, to orient the lines of brushes 320 for the required phase angle relationship.

Figure 15:
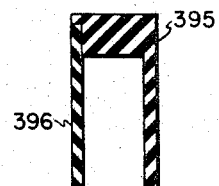
FIGURE 15 is a cross-sectional view taken along line 15—15 of FIGURE 14.
Figure 12:
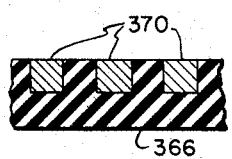
FIGURE 12 is an enlarged cross-sectional view taken along line 12—12 in FIGURE 10.
Figure 13:
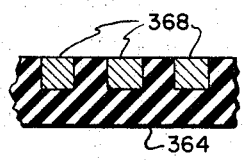
FIGURE 13 is an enlarged cross-sectional view taken along line 13—13 in FIGURE 10.
Figure 14:
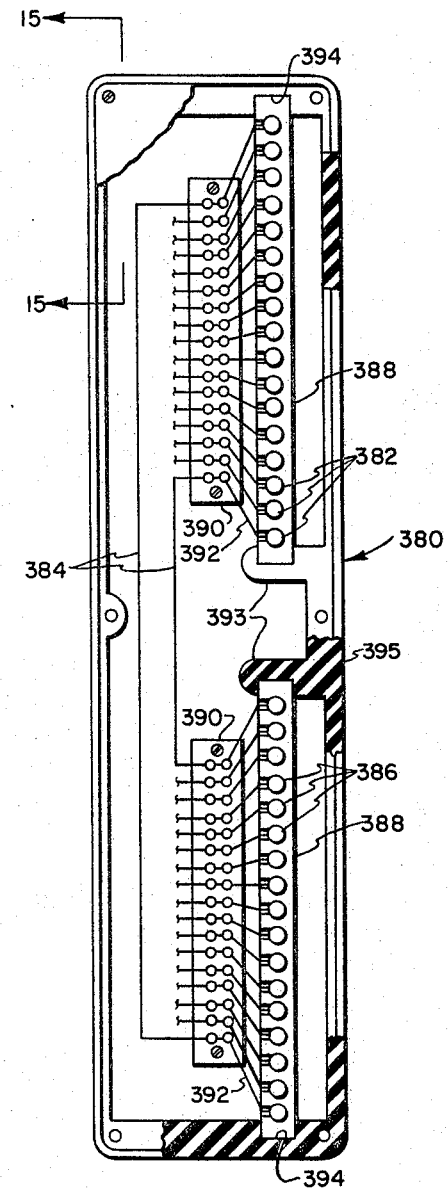
FIGURE 14 is a partially diagrammatic elevational view of a connecting brush assembly.
Figure 16:
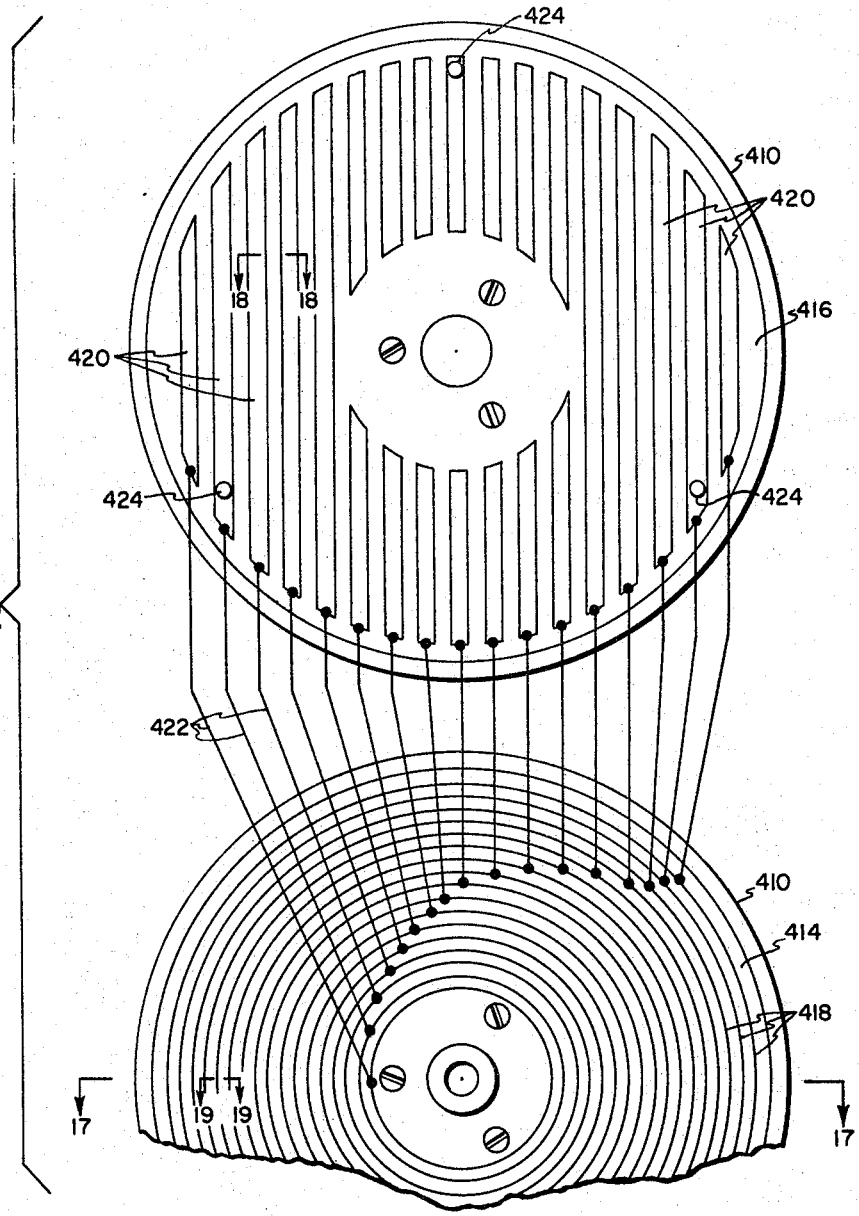
FIGURE 16 is a diagrammatic view showing both faces of an integrating disc.
Figure 17:
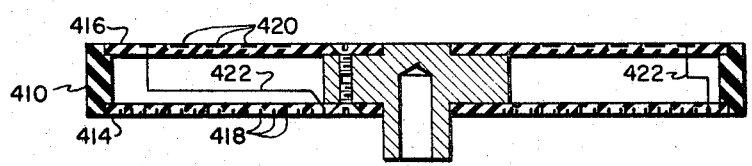
FIGURE 17 is a partially diagrammatic cross-sectional view taken along line 17—17 of FIGURE 16.

The fixed increments of direct current voltage available at slip rings 370, the output of the rectifying means 30, are carried to the input of the integrating means 40 by means of the connecting brush unit 380 illustrated in FIGURES 1, 14 and 15. The connecting brush unit 380 is placed adjacent the face plate 366 of disc 360 so that the slip rings 370 will be contacted by a corresponding number of brushes 382, one brush for each ring. Brushes 382 are electrically connected by means of conductors 384, shown diagrammatically in FIGURE 14, to a like number of corresponding brushes 386 which are mounted in similar arrangement to brushes 382 but are at a distance from brushes 382. Each set of brushes 382 and 386 are mounted in brush holders 388 and electrically connected to terminal blocks 390 by leads 392 as set forth in the description of brush assembly 310 above. The brush holders 388 are fixed within the brush unit 380 by means of brackets 393 and 394 which are shown formed integral with the body 395 of the unit. A cover 396 completes the connecting brush unit which remains stationary with respect to the rotating disc 360.

Turning now to the integrating means 40, the details of which are best illustrated in FIGURES 16 through 22, as well as in FIGURE 1, an integrating disc 410 is shown mounted for rotation with a splined shaft 412 and is provided with opposite face plates 414 and 416, respectively, of dielectric material. In order that the integrating means 40 receive the fixed increments of direct current voltage from the rectifying means 30, a plurality of electrical contacts, shown in the form of slip rings 418, are embedded within face plate 414 for rotation with disc 410, the number and arrangement of the slip rings 418 corresponding to the number of fixed increments of voltage and the number and arrangement of brushes 388 in the connecting brush assembly 380. The longitudinal axis of shaft 412, which corresponds to the central axis of the disc 410, is fixed such that brushes 380 will contact slip rings 418.

Embedded in the opposite face plate 416 is a series of parallel commutator bars 420 corresponding to the number of slip rings 418. The commutator bars 420 are in a pattern running transverse to the central axis of the disc 410 which lies at the center of the pattern. As seen schematically in FIGURE 16, the radially innermost slip ring 418 is electrically connected to the first of the series of commutator bars 420 and the radially outermost slip ring 418 is electrically connected to the last of the series of commutator bars 420 with corresponding consecutive slip rings being electrically connected to corresponding consecutive commutator bars by conductors 422 so that each fixed increment of voltage is available between immediately adjacent bars 420 with the total voltage being available between the first and last bars (the first bar being bar 420 furthest to the left in FIGURE 16 and the last bare being bar 420 furthest to the right in the same figure).

Upon rotation of shaft 412 and disc 410, the voltage available between any two of the points 424 which contact face plate 416 (and the commutator bars 420 embedded therein) but remain stationary relative to such rotation will be an alternating current voltage having a stepped wave form approximating a sinusoidal wave, as illustrated in FIGURE 3. The frequency of the sinusoidal wave will depend upon the speed of rotation of the disc 410. By providing a sufficient number of fixed increments of voltage throughout the apparatus, the stepped wave form can be made to approximate a true sinusoidal wave for practical purposes, such as for example, for the purpose of driving a synchronous alternating current motor at a speed dictated by the selected frequency.

It is noted that disc 410 may be rotated independent of disc 360 so that the apparatus allows the choice of frequency in the alternating current voltage available between points 424 to be made independent of the frequency of the alternating current voltage at the source 10, the rate of the mechanical integration performed by the integrating means 40 thus being selective.

While a variety of means may be chosen to rotate disc 410 and thus actuate integrating means 40, the illustrated embodiment employs a simple variable speed drive mechanism which receives motive power from rotating shaft 362 by means of bevel gears 430 and 432 (see FIGURE 1) which rotates drive shaft 434 and the drive disc 436 fixed thereto. A driven wheel 438 frictionally engages drive disc 436 and is slotted to engage the splines of shaft 412 and rotate the shaft while allowing axial movement of wheel 438 along shaft 412. A carriage 440 may be moved to the left or to the right as seen in FIGURE 1 by rotation of lead screw 442 through the actuation of hand wheel 444 to move driven wheel 438 along shaft 412 (as seen in phantom in FIGURE 1) and select the speed of rotation of disc 410. Since the frequency of the voltage output of disc 410 is proportional to the speed of rotation, a pointer 446 may be fixed to the carriage 440 to indicate the selected frequency along a scale 448 so calibrated. Of course, the illustrated apparatus may be operated at a fixed ratio between the rotation of disc 410 and disc 360 where a fixed ratio between the input frequency and the output frequency is desired.

Figure 20:
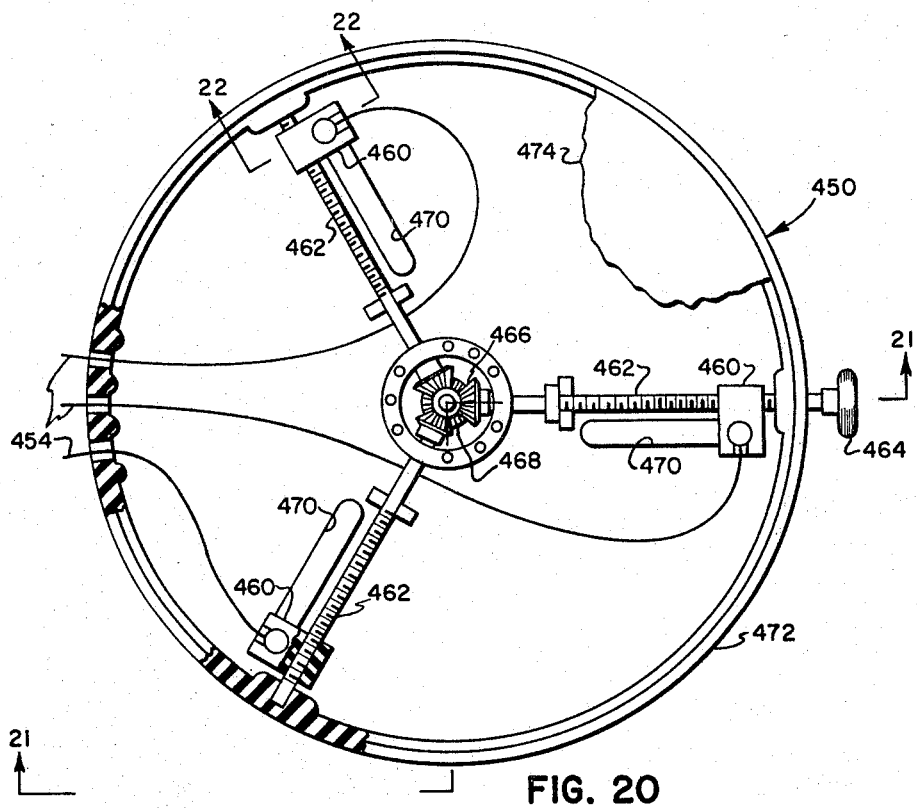
FIGURE 20 is a partially diagrammatic elevational view of an output brush assembly.
Figure 21:
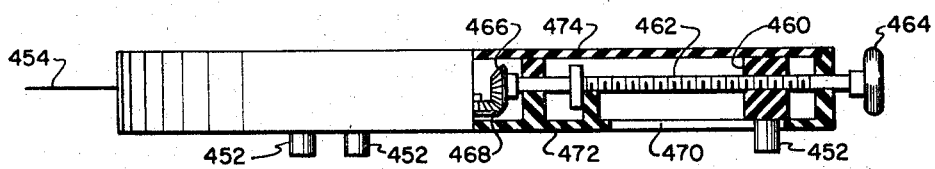
FIGURE 21 is a partially diagrammatic cross-sectional view taken along line 21—21 of FIGURE 20.
Figure 18:
FIGURE 18 is an enlarged cross-sectional view taken along line 18—18 of FIGURE 16.
Figure 19:
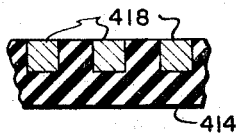
FIGURE 19 is an enlarged cross-sectional view taken along line 19—19 of FIGURE 16.
Figure 22:
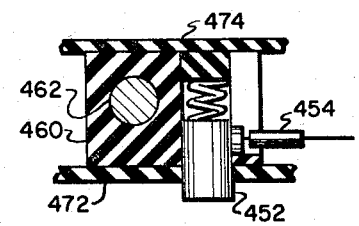
FIGURE 22 is an enlarged cross-sectional view taken along line 22—22 of FIGURE 20.

The output alternating current voltage available at face plate 416 of disc 410 is taken off the disc 410 and transmitted to output 50 by means of an output brush assembly 450, the details of which are illustrated in FIGURES 20 through 22, as well as in FIGURE 1. Primarily, brush assembly 450 provides brushes 452 at points 424 (see FIGURE 16) to contact the commutator bars 420 and is mounted in such a fixed relationship to disc 410 as to accomplish this end. It is noted that the brushes 452 are angularly spaced from one another to retain the original three phase relationship of the source 10 in the output 50. Each brush 452 is electrically connected to output 50 through conductors 454 and a fused disconnect 456.

It is sometimes desirable to change the voltage at the output 50 as well as the frequency, and such changes may be accomplished in the illustrated apparatus, even during operation. To this end, each brush 452 is mounted in a radially movable block 460 which engages a lead screw 462 selectively rotated by the actuation of a hand wheel 464. Actuation of the hand wheel 464 will rotate all of the lead screws 462 simultaneously by virtue of bevel gears 466 and 468. Brushes 452 project through radial slots 470 of the body 472 of the brush assembly. It will be apparent that as brushes 452 are moved radially inwardly along slots 470, points 424 contact more closely adjacent commutator bars 420 (see FIGURE 16) and the voltage between these points decreases. Since the output brush assembly 450 does not rotate, such adjustments can be made during operation of the apparatus.

The illustrated embodiment provides a variety of safety devices and convenient indicating means. Referring now to FIGURE 1, a time delay relay 510 having contacts 512 is provided to prevent the transformer from being energized unless the drive motor 372 is energized and has been brought up to speed. A three phase capacitor unit 520 is provided prior to the output to aid in smoothing out the steps in the output wave form. Where it is desirable to maintain the output frequency above a given minimum frequency level a relay 522 is provided with contacts 524, the relay being set to open only below the minimum frequency level. Such a measure is secondary protection to that provided by lock nuts 530 on lead screw 442. A sub-fractional synchronous motor 550 is connected directly to a direct current tachometer generator 551. A direct current voltmeter 552 calibrated to read frequency, synchronous speed or both frequency and synchronous speed, serves as a check against the reading of pointer 446 on scale 448. An alternating current voltmeter 553 indicates output voltage, while a direct current voltmeter 554 shows the RMS or effective value of the intermediate direct current voltage between the outermost and innermost slip rings of either the rectifying disc or the integrating disc. A lamp 555 indicates when the apparatus is energized, while lamp 556 is so connected as to be normally off and to indicate, by lighting, only if alternating current voltages appear in the output of the rectifying means. The indicating lamp 556 operates through a capacitor 557 which will pass alternating current to provide the desired indication but will not, of course, pass direct current through indicating lamp 556. Resistors 558 limit the voltage across the lamps to the design value of the pilot lamps selected.

An example of the way in which the illustrated embodiment operates is as follows: A three phase supply having a frequency of 60 cycles per second and a voltage of 440 volts RMS and 62 volts peak is transformed upward by a ratio of 1:1.330 to 585 volts RMS with an 825 volt peak. The secondary windings are divided into sixteen increments, which increments are conducted to the rectifying means as described above. The rectifying means provides an output of pulsating direct current at 360 pulses per second and 790 volts effective value with an 825 volt peak. The direct current voltage output of the rectifying means is retained in sixteen equal increments and passed through the connecting brush assembly to the integrating means where the direct current voltage is connected to the parallel commutator bars in sixteen increments of 49.4 volts each in effective value. As the rotating commutator bars of the integrating means pass under the three output brushes in the output brush assembly, an alternating current voltage having a stepped wave form approximating a sinusoidal wave is generated across each pair of brushes or across each phase and since the brushes are angularly spaced at 120° apart, the proper three phase difference is maintained in the output. The output brushes are radially adjustable from a maximum radius where the alternating current voltage pattern would be 790×0.866=684 volt peak and 484 volt RMS, which is 10 percent above the initial line voltage of 440 volts RMS. Adjustments may be made downward from 484 volts RMS to as low as 220 volts RMS. The frequency is adjusted through a change of speed of the integrating disc and such a change is readily accomplished through proper positioning of the drive wheel relative to the driving disc as shown in FIGURE 1.

Initially it is important that the proper phase angle relationship exists between the rotor of the synchronous motor and the commutating plate. Such an adjustment is a permanent one since it is related to the inherent phase angle difference dictated by the synchronous motor 372. To this end four provisions are made. First, the brush assembly is rotationally adjustable, as described above. Second, the gaps between arcuate commutating segments is open to an angle great enough (30° in the illustrated embodiment) so that a "dead zero" or "dead peak" alignment is not required. Third, voltmeter 554 is provided to indicate whether the correct or maximum effective value of the direct current voltage is being attained, and fourth, a lamp is provided to indicate when an alternating current voltage appears in the output of the rectifier means. Rotational adjustment of the brush assembly will assure correct effective direct current voltage in the output of the rectifier means.

It is to be understood that the above detailed description is provided by way of example only and is not intended to restrict the invention. Various details of design and construction may be varied without departing from the true spirit and scope of the invention as set forth in the appended claims.

I claim:

1. Apparatus capable of providing a selected frequency output in alternating current power systems having a source of alternating current of fixed frequency and voltage, said apparatus comprising:
   (A) means for resolving the source of alternating current voltage into a plurality of fixed increments of voltage;
   (B) mechanical means receiving said fixed increments and capable of being mechanically actuated in synchronization with said fixed frequency for rectifying the alternating current voltage in fixed increments into substantially direct current voltage in a like number of fixed increments of voltage;
   (C) mechanical means receiving the direct current voltage in said fixed increments and capable of mechanically integrating said fixed increments of direct current voltage into an alternating current output voltage having a stepped wave form approximating a sinusoidal wave; and
   (D) means for actuating said integrating means such that said integration will take place at a rate selected independent of the rate of actuation of said rectifying means and the fixed frequency of the source alternating current voltage to attain the desired frequency in the output voltage when the rectifying means is actuated in synchronization with said fixed frequency.

2. The apparatus of claim 1 including means for selectively varying the rate of actuation of the integrating means by said means for actuating the integrating means such that the integrating rate may be selectively varied to vary the frequency of the output alternating current over a desired range.

3. Apparatus capable of providing a selected frequency output in alternating current power systems having a source of alternating current of fixed frequency and voltage said apparatus comprising:
   (A) means for resolving the source of alternating current voltage into a plurality of fixed increments of voltage;
   (B) a number of first commutator elements corresponding to the number of increments of voltage, said elements receiving said fixed increments of voltage;
   (C) a number of first electrical contacts corresponding to the number of increments of voltage, said first commutator elements and electrical contacts being oriented and electrically connected such that upon rotation of the elements and contacts in synchronization with said fixed frequency, the increments of alternating current voltage are rectified to corresponding increments of substantially direct current voltage at the electrical contacts;
   (D) a number of second electrical contacts corresponding to the number of increments of direct current voltage, said second contacts being electrically connected with said first electrical contacts;
   (E) a number of second commutator elements corresponding to the number of increments of direct current voltage, said second electrical contacts and commutator elements being oriented and electrically connected such that upon rotation of the second elements and contacts, said increments of direct current voltage are integrated into an alternating current output voltage between points contacting said second commutator elements and fixed relative to said rotation, said alternating current voltage having a stepped wave form approximating a sinusoidal wave; and
   (F) means for rotating said second commutator elements and electrical contacts at a speed chosen independent of the speed of rotation of the first commutator element and electrical contacts and the fixed frequency of the source alternating current voltage to attain the desired frequency in the output voltage when the first commutator elements are rotated in synchronization with said fixed frequency.

4. Apparatus of claim 3 wherein the speed of rotation of the second commutator elements and electrical contacts may be selectively varied by the last said means to vary the frequency of the output alternating current voltage over a desired range.

5. Apparatus capable of providing a selected frequency output in alternating current power systems having a source of alternating current of fixed frequency and voltage, said apparatus comprising:
   (A) means for resolving the source of alternating current voltage into a plurality of fixed increments of voltage;
   (B) a rectifying member rotatable about a fixed axis of rotation;
   (C) a number of commutator elements corresponding to the number of increments of voltage, each element being an arcuate segment fixed for rotation with said rectifying member with the center of each element lying on the axis of rotation;
   (D) a number of first electrical contacts corresponding to the number of increments of voltage, each electrical contact being fixed for rotation with said rectifying member with the center of each element lying on the axis of rotation;
   (E) means for conducting the resolved increments of alternating current voltage to said commutator elements;
   (F) means electrically connecting said commutator elements to said electrical contacts such that upon rotation of the rectifying member in synchronization with said fixed frequency, the increments of alternating current voltage are rectified to corresponding increments of essentially direct current voltage at the electrical contacts;
   (G) an integrating member rotatable about a fixed axis of rotation;
   (H) a number of second electrical contacts corresponding to the number of increments of direct current voltage, each electrical contact being fixed for rotation with the integrating member with the center of rotation of each electrical contact lying on the axis of rotation;
   (I) a number of substantially parallel spaced commutator bars corresponding to the number of increments of direct current voltage, each bar being fixed for rotation with the integrating member in a surface of the member extending transverse to the direction of the axis of rotation;
   (J) said first electrical contacts being electrically connected to corresponding second electrical contacts but capable of rotation independent of said second electrical contacts;
   (K) means electrically connecting each second electrical contact to a corresponding bar such that upon rotation of the integrating member said increments of direct current voltage are integrated into an alternating current output voltage between points contacting said surface and fixed relative to said rotation, said points being radially displaced from the center of rotation and angularly displaced from one another, said alternating current voltage having a stepped wave form approximating a sinusoidal wave; and
   (L) means for rotating said integrating member at a speed chosen independent of the speed of rotation of said rectifying means and the fixed frequency of the source alternating current voltage to attain the desired frequency in the output voltage when the rectifying member is rotated in synchronization with said fixed frequency.

6. Apparatus of claim 5 wherein said surface and the bars lie in a plane perpendicular to the axis of rotation of the integrating member, each increment of direct current voltage being conducted to adjacent bars, the total direct current voltage being available between the outermost bars.

7. Apparatus of claim 6 wherein the speed of rotation of the integrating member may be selectively varied by the last said means to vary the frequency of the output alternating current voltage over a desired range.

8. Apparatus of claim 7 including third electrical contacts at said points for conducting the output voltage from said surface, said third contacts being selectively radially movable with respect to the center of rotation of the integrating member in order to vary the magnitude of the output voltage.

9. Apparatus of claim 8 wherein:
   (A) the rectifying member comprises a disc having first and second planar faces perpendicular to a central axis of rotation, the commutator elements lying in the first face concentric about the central axis and the first electrical contacts comprising slip rings lying in the second face concentric about the central axis;
   (B) the integrating member comprises a disc having first and second planar faces perpendicular to a central axis of rotation, the second electrical contacts comprising slip rings lying in the first face concentric about the central axis and the commutator bars lying in the second face and establishing a pattern, the center of which pattern lies on the central axis; and
   (C) corresponding first and second slip rings being electrically connected by a non-rotating brush assembly.

References Cited
UNITED STATES PATENTS
1,691,986  11/1928  Nyquist _____ 321—10 X
3,100,851  8/1963  Ross et al.

FOREIGN PATENTS
1,063,011  12/1953  France.

JOHN F. COUCH, *Primary Examiner.*

W. H. BEHA, JR., *Assistant Examiner.*